US011259469B2

(12) United States Patent
    Dreier

(10) Patent No.: US 11,259,469 B2
(45) Date of Patent: Mar. 1, 2022

(54) GRINDING DEVICE AND GRINDING METHOD WHEREIN A GRINDING UNIT CAN OPERATE ON-BOARD AS WELL AS OFF-BOARD

(71) Applicant: Forage Company B.V., Maassluis (NL)

(72) Inventor: Thomas Dreier, Deisenhausen (DE)

(73) Assignee: Forage Company B.V., Maassluis (NL)

( * ) Notice: Subject to any disclaimer, the term of this patent is extended or adjusted under 35 U.S.C. 154(b) by 731 days.

(21) Appl. No.: 15/766,018

(22) PCT Filed: Oct. 3, 2016

(86) PCT No.: PCT/NL2016/050676
    § 371 (c)(1),
    (2) Date: Apr. 5, 2018

(87) PCT Pub. No.: WO2017/061857
    PCT Pub. Date: Apr. 13, 2017

(65) Prior Publication Data
    US 2018/0288942 A1    Oct. 11, 2018

(30) Foreign Application Priority Data
    Oct. 5, 2015  (NL) ...................................... 2015561

(51) Int. Cl.
    B24B 3/36    (2006.01)
    B24B 3/55    (2006.01)
    (Continued)

(52) U.S. Cl.
    CPC ................. A01F 29/22 (2013.01); B24B 3/36 (2013.01); B24B 3/55 (2013.01); B24B 3/58 (2013.01)

(58) Field of Classification Search
    CPC .. A01F 29/22; B24B 3/55; B24B 3/58; B24B 3/586; B24B 3/36; B24B 41/06; B26D 7/01
    (Continued)

(56) References Cited

U.S. PATENT DOCUMENTS 1,163,016 A * 12/1915 Knudsen ................... B24B 3/55
                                                     451/372
2,715,797 A *  8/1955 Fuller ....................... B24B 3/55
                                                     451/122
(Continued)

FOREIGN PATENT DOCUMENTS

DE    20 2004 009498 U1    9/2004
EP           2810738 A1   12/2014

OTHER PUBLICATIONS

European Patent Office, International Search Report for priority application No. NL 2015561, dated Apr. 9, 2016.
(Continued)

*Primary Examiner* — Eileen P Morgan

(57) ABSTRACT

A grinding device and a grinding method for grinding at least one knife. The grinding device includes a frame with a knife holder and a grinding unit comprising a grinding head, a grinding head holder, and a grinding head drive assembly. The grinding unit can selectively be connected with the frame or can be disconnected from the frame and can be placed on a cutting assembly with knives to be ground. In both operating modes the grinding head drive assembly rotates the grinding head and moves the rotating grinding head with respect to the grinding head holder.

11 Claims, 5 Drawing Sheets

(51) Int. Cl.
*B24B 3/58* (2006.01)
*A01F 29/22* (2006.01)

(58) Field of Classification Search
USPC ......... 451/45, 193, 196, 198, 234, 235, 293,
451/349, 367, 372, 419, 420
See application file for complete search history.

(56) References Cited

U.S. PATENT DOCUMENTS

| | | |
|---|---|---|
| 2,729,121 A | 1/1956 | Robinson et al. |
| 5,725,415 A * | 3/1998 | Bernhard ............... A01D 75/08 |
| | | 451/141 |
| 6,942,553 B1 | 9/2005 | Salafia |
| 2007/0184760 A1* | 8/2007 | Cotton ...................... B24B 3/42 |
| | | 451/45 |
| 2012/0052775 A1* | 3/2012 | Meiners .............. B24B 27/0015 |
| | | 451/283 |
| 2012/0052776 A1* | 3/2012 | Zemenchik ............ A01B 23/06 |
| | | 451/293 |

OTHER PUBLICATIONS

European Patent Office, International Search Report for International Patent Application No. PCT/NL2016/050676, dated Jan. 3, 2017.
European Patent Office, Office Action for related European Application No. EP16784986.8, dated May 31, 2021.

* cited by examiner

GRINDING DEVICE AND GRINDING METHOD WHEREIN A GRINDING UNIT CAN OPERATE ON-BOARD AS WELL AS OFF-BOARD

FIELD OF THE INVENTION

The invention refers to a grinding device and to a grinding method for grinding at least two knives, in particular for grinding several knives in a knife holder and a sequence of knives belonging to a cutting assembly of an agricultural harvester, by using the same grinding unit.

BACKGROUND OF THE INVENTION

The task of grinding a set of knives often occurs in the domain of agriculture. A modern harvester, e.g. a baler or a loader wagon or a field chopper, comprises a cutting assembly with a sequence of knives. The harvester picks up or otherwise receives crop material from the ground and conveys the picked-up or otherwise received crop material through a feeding channel towards a processing or loading chamber. The knives engage into the feeding channel and cut the conveyed crop material.

From time to time it is necessary to grind the knives, i.e. to sharpen their cutting edges. Different approaches how to do so have been published.

U.S. Pat. No. 2,729,121 discloses a disc sharpening apparatus which can selectively be used as a portable or as a stationary disc sharpener. Rollers 138 and 140 are mounted on shafts 134 and 136 and can sharpen a disc D. The shafts 134, 136 are mounted on a support 72 which is supported by a subframe 56. The subframe 56 is mounted on a main frame 10. When the disc sharpener is used as a stationary device a disc D to be sharpened is mounted on a shaft 198 which is kept by the subframe 56, cf. FIG. 16. When being used as a portable device, the main frame 10 is moved by means of rollers 206 and rails 208 placed on the ground, cf. FIG. 4. By means of a lever 158 the rollers 138,140 can be moved up to the discs D to be sharpened, cf. FIG. 1. The screw 106 applies pressure on the rollers 138, 140.

DE 10352328 A1 discloses a device for grinding a knife (Messerschleifmaschine 1). A grinding disc (Schleifscheibe 20) of a grinding tool (Scheibenschleifer 19) contacts and grinds a knife (Messer 4) which is kept in a vertical position in a knife holder (Einspannvorrichtung 12). A drive (Schleifantrieb 21) rotates the grinding disc 20. The grinding tool 19 is mounted on the free end of a pivoting arm (Schwenkarm 23). For adjusting the grinding disc 20 the grinding tool 19 can be pivoted with respect to the pivoting arm 23 around an axis 24. The pivoting arm 23 can rotate around an axis 27 being perpendicular to the pivoting arm axis, cf. FIG. 4.A drive (Schwenkarmantrieb 35) can oscillate the arm 23 around the axis 27. Thanks to a carrier (Schwenkarm-Tragstück 28) the distance between the grinding tool 19 and the axis 27 and therefore the lever arm length (effective Pendellänge des Schwenkarms 23) can be adjusted. In addition the axis 27 can be adjusted in a vertical as well as in a horizontal direction. On the one hand a bearing (Lagerbock 30) carries the axis 27 and can be shifted horizontally on a carrying arm (Tragarm 31). On the other hand the carrying arm 31 can be shifted vertically along a stationary guiding element (Führung 32).

US 20120052776 A1 discloses a blade sharpening system for an agricultural implement, e.g. a vertical tilling implement 10 with a gang 40 of concave-shaped blades 22, cf. FIG. 1. A blade sharpening system 38 can be mounted on the gang 40, cf. FIG. 2. A sharpening assembly 50 sharpens the edge 54 of a blade 22. A sharpener 60 engages the blade 22 currently to be sharpened. A drive unit 52 rotates the blade 22 to be sharpened. The sharpening assembly 50 can move along a rail 56 in two opposite directions 66 and 68. For moving the sharpening assembly 50 from one blade 22 to a further blade, an operator lifts a handle 76 upwards. A screw 80 can lock the movement of the sharpening assembly 50 along the rail 56.

The portable automated sharpening apparatus 10 of U.S. Pat. No. 6,942,553 B1 sharpens a blade by means of a sharpening assembly 12 with at least one sharpening element 14, cf. FIG. 2. A sharpening motor 16 can rotate the sharpening element 14 around the axis 17, cf. FIG. 1 and FIG. 3. The axis 17 can be parallel to the reel blade axis RBA, cf. FIG. 1. A drive assembly 30 with a drive motor 32 can move the sharpening element 14 along a drive path 36. The sharpening apparatus 10 can removably be interconnected to a reel blade mechanism by means of a support assembly 20.

EP 2810738 A1 discloses a device for grinding at least one knife 26. A motor 3 drives a grinding stone (Schleifstein 2). The grinding member (Schleifeinheit 1) with the grinding stone 2 and the motor 3 is mounted on a carrying arm 5. A guiding element 4 for the grinding member 1 engages into apertures (Aussparungen 8) of a template (Schablone 7). This template 7 determines the trajectory or contour along which the grinding member 1 is moved. The knife 26 to be ground rests on a supporting plane (Auflagefläche 12) and contacts a movement limiting element (Messeranlage 11). The cutting edge of a knife 26 to be ground contacts the movement limiting element 11. The knife 26 is kept in a position by the limiting element 11 and by a lateral limiting element 14. Every knife 26 is clamped between the supporting plane 12 and an opposing element (Gegenstück 16).

EP 1621065 B2 discloses a loader wagon (Ladewagen 1) which picks up loose crop material from the ground and conveys the picked-up crop material through a feeding channel (Förderkanal 6) to a loading chamber. Conveying tines (Förderzinken 7) engage from above into the feeding channel 6 and correspond with cutting knives (Schneidmesser 8, 9), cf. FIG. 1. The knives 8 can be pivoted from an engaging cutting position (FIG. 1) into a non-engaging maintenance position (FIG. 2). When the knives 8 are in the maintenance position, a sharpening device (Schärfeinrichtung 10) mounted on board of the loader wagon 1 can grind the knives 8 by means of several sharpening bodies (Schärfkörper 14). A drive (Antriebseinrichtung 18) with a positioning member (Stellglied 19) oscillates the sharpening body 14 along the cutting edges (Schneidkanten 12) of the knives 8.

EP 2272318 B1 discloses an agricultural harvester (Erntemaschine) which picks up crop material (Erntegut) from the ground and conveys the picked-up crop material through a feeding channel (Förderkanal 9). A cutting assembly (Schneidvorrichtung 10) with several knives (Messer 12) cuts the crop material while it is conveyed through a feeding channel 9. The harvester further comprises a grinding device (Schleifvorrichtung 13) for grinding the knives 12. A positioning motor (Stellantrieb) and a guiding device (SchleiferfOhrung 15) guides the grinding body (Schleifer 14) along the cutting edge of a knife 12. On the one hand the grinding body 14 is mounted at a traversal slide (Querschlitten 17) and can be moved perpendicular to the conveying direction of the crop material. On the other hand the grinding body 14 is mounted at a parallel slide (Längsschlitten 18) such that the grinding body 14 can be moved along the cutting edge of a knife to be ground.

DE 202004009498 U1 discloses a grinding device with a magazine (Werkstückmagazin 2). The knives (Schneidmesser 3) to be ground are kept by this magazine 2. Several knives 3 can be kept one above the other in the magazine 2, cf. FIG. 1. A grinding unit (Schleifeinheit 13) can be moved up and down with respect to the magazine and comprises a grinding head (Schleifkopf 17) and a drive (Schwenkantrieb 18) for the grinding head 17.

U.S. Pat. No. 939,115 discloses a portable grinding device for grinding disc-shaped knives. FIG. 1 shows a shaft 4 with three discs 2 of a harrow. Three grinding bodies each 35 having the shape of a disc and a conical extension are mounted on a driven shaft 25. A chain drive transfers a rotation of the knives shaft 4 onto the grinding shaft 25.

GB 2144030 A discloses a loader wagon with a pivotal cutting assembly and a grinding device. FIG. 1 shows two cutting blades 7 and 8. FIG. 2 shows a grinding device 23 for these blades 7, 8. The grinding device 23 comprises a grinding disc 28 mounted on a pivotal bar 26. This bar 26 is mounted on a traversal bearing 25 which is mounted on a transversal tube 24. A motor 27 drives the grinding disc 21 and is also mounted on the pivotal bar 26. The top view of FIG. 3 shows the inclined position of the grinding device 23 with respect to the blades 7 to be ground.

SUMMARY OF THE INVENTION

The grinding device according to the invention comprises
a frame and
a grinding unit.

The frame comprises a knife holder. The knife holder can hold at least one knife to be ground.

The grinding unit is arranged as a portable unit, i.e. one operator or at the most two operators can carry and move the grinding unit without using the frame. The grinding unit comprises
a grinding head,
a grinding head holder, and
a grinding head drive assembly.

The grinding head drive assembly rotates the moved grinding head and moves the grinding head with respect to the grinding head holder. The rotated and moved grinding head contacts at least one knife to be ground. Thanks to the rotation and the movement a cutting edge of at least one contacted knife is sharpened by the grinding head.

The grinding unit can be connected with the frame. The connection between the grinding unit and the frame can be disconnected during regular operation, at least while the grinding head does neither rotate nor move. After disconnecting the connection, the portable grinding unit can be moved away from the frame.

The grinding head drive assembly can rotate the grinding head with respect to the grinding head holder. In addition the grinding head drive assembly can move the rotated grinding head with respect to the grinding head holder. The grinding head drive can rotate and move the grinding head while the grinding unit is connected with the frame as well as while the grinding unit is disconnected from the frame. When being connected with the frame, the rotated and moved grinding head can grind at least one knife held by the knife holder. When being disconnected and moved away from the frame, the rotated and moved grinding head can grind at least one knife positioned outside of the knife holder.

The grinding device can subsequently grind at least two knives, namely one knife held by the knife holder and one knife outside of the knife holder. When the grinding method according to the invention is performed, at least two consecutive grinding procedures are performed. In every grinding procedure at least one knife is ground. Every grinding procedure comprises the following steps:

The grinding head contacts the or at least one knife to be ground.
The grinding head drive assembly moves, in particular rotates, the grinding head with respect to the grinding head holder.
The grinding head drive assembly moves the rotated grinding head with respect to the grinding head holder.

In at least one grinding procedure at least one knife held by the knife holder is ground. While performing this grinding procedure, the grinding unit is releasably connected with the frame.

In at least one further grinding procedure at least one knife which is positioned outside of the knife holder and which belongs to a cutting assembly is ground. For grinding the knife outside of the knife holder the grinding unit is disconnected and is moved away from the frame and is temporarily connected with the cutting assembly. While the further grinding procedure is performed, the grinding unit remains connected with the cutting assembly.

Advantages

According to the invention the grinding unit drive assembly can rotate the grinding head and can additionally move the rotated grinding head with respect to the grinding head holder. Thereby the rotated grinding head can be moved along a cutting edge of a knife and can sharpen the cutting edge. It is not necessary that the knife itself is moved. In particular the knife can keep its position with respect to the grinding head holder while being ground. This advantage occurs for a knife in as well as for a knife outside of the knife holder. This feature makes it possible to grind knives of a cutting assembly mounted on board of a vehicle without moving the knife while being ground. In addition it is not necessary to move a knife which is kept by the knife holder while being ground. This feature saves a drive for rotating or otherwise moving the knife to be ground.

The frame with the knife holder has the purposes
of keeping at least one knife to be ground and
of carrying the grinding unit while the grinding unit is connected with the frame.

The frame does not need a drive or a connection to a hydraulic or electric source. The frame can therefore be implemented as a purely mechanical device without parts which are actively driven and without a motor.

According to the invention the grinding unit can selectively be releasably connected with the frame comprising the knife holder or can be disconnected from the frame. Thereby the grinding unit can be placed on or otherwise connected with the frame with the knife holder or onto a cutting assembly comprising at least one knife to be ground. Therefore the same portable grinding unit can selectively grind
at least one knife positioned outside of the knife holder, e.g. being part of the cutting assembly and therefore still be mounted on a vehicle or further cutting system (on-board operating mode) or
at least one knife which is held by the knife holder (off-board operating mode).

Thanks to this flexibility it is possible but not necessary to remove a knife to be ground from a cutting assembly of a vehicle or further cutting system and to place the removed knife in the knife holder. The grinding unit connected with the cutting assembly can grind the or at least one knife belonging to this cutting assembly. In particular it is possible to grind at least one knife mounted on board of an agricultural harvester. As the grinding unit can be used in an on-board and in an off-board operating mode, the same grinding device can subsequently grind knives with different shapes or dimensions or knives with several cutting edges.

It is possible but not necessary to change or amend the grinding unit when the grinding unit is first used for knives of on a cutting assembly (on-board operating mode) and later for knives held by the knife holder (off-board operating mode) or vice versa. This reduces the required readjustment time and increases the throughput. The same portable grinding unit can be reused for an on-board and for an off-board operation.

Thanks to the invention it is possible but not necessary to permanently mount the grinding unit on board of a vehicle, e.g. of an agricultural harvester, which comprises the cutting assembly. Preferably the grinding unit is only connected with the vehicle while at least some knives of the vehicle are ground. As the grinding unit is not permanently mounted on board of the vehicle, the grinding unit is not subjected to wear and environmental conditions while the vehicle is moved over ground and performs a given function or operation, e.g. while the vehicle operating as a harvester picks up and processes crop material. As the grinding unit is not permanently a part of one vehicle, the same grinding unit can subsequently grind knives of different cutting assemblies, e.g. of different vehicles. This feature saves weight and costs compared with a grinding unit which is prominently mounted on board of the vehicle.

Thanks to the invention it is possible to bring a knife to be ground to the grinding unit which is connected with the frame. It is further possible to bring the same grinding unit to a knife to be ground after the grinding unit is disconnected from the frame.

Thanks to the invention it is possible to test whether or not the grinding unit can grind at least one knife while the knife belongs to a cutting assembly, e.g. while the knife is mounted on board of a vehicle. It can be tried to place the grinding unit on the cutting assembly.

Due to high wear the knife may have a shape differing from further knives of the same cutting assembly. Or the available space on board of the vehicle does not suffice for placing the grinding unit on a knife of the cutting assembly on board of the vehicle. If it turns out that it is not possible to grind the knife on board of the vehicle, the knife can be removed from the vehicle and can be fixed in the knife holder. Now the same grinding unit can be placed on the knife holder and can grind the knife held by the knife holder.

Preferred Embodiments

Preferably the grinding head comprises a shaft and a sequence of several grinding bodies which are mounted on the shaft, preferably rigidly mounted. Thanks to this embodiment the grinding device can simultaneously grind a sequence with several knives, in particular several knives on board of a vehicle. The grinding head drive assembly rotates and moves the shaft and thereby the grinding body sequence on the shaft.

Preferably the knife holder can simultaneously hold several knives. This embodiment together with the sequence of grinding bodies makes it possible to grind several knives simultaneously while the grinding unit is placed on the frame with the knife holder.

Different embodiments how to keep a knife to be ground in the knife holder are possible. Preferably the or every knife to be ground is kept in a vertical orientation. Preferably the or every knife is kept between two parallel plates. The plates belong to the knife holder and prevent the knife to move perpendicular to the knife plane, e.g. in a direction parallel to the shaft of the grinding head.

Preferably the knife holder keeps a knife to be ground by means of a pair with two parallel knife holder plates and further by means of several pins. The pins are guided through holes in the knife holder plates, preferably in a horizontal direction. Every knife holder plate comprises a hole pattern with several holes. Preferably every pin can be inserted into the plates in a position selected out of several possible positions. Every pin can be removed from the plate. The pins can be guided in different positions through the plate pair. Therefore the same knife holder can subsequently carry knives with different dimensions or shapes. For adjusting the knife holder to a knife's dimension or shape it is just necessary to position at least one pin in a selected place in the knife holder plates. The knife holder plates need not be amended or changed.

Preferably the grinding unit is positioned vertically above the frame and in particular above the knife holder at least when the grinding unit is connected with the frame. The force of gravity keeps the grinding unit on the frame.

Preferably a fixing member can connect the grinding head holder with the frame. The connection which is established by the fixing member can be released during normal operation. Preferably the fixing member can also fix the grinding head holder on a cutting assembly.

Preferably the dimension of the fixing member in a direction pointing to the frame can be adjusted. Preferably the grinding head rests on a foot. The distance between the foot and the grinding head can be changed. In the case that the grinding unit is positioned above the frame the vertical distance can be adjusted. Thanks to the adjustable fixing member the distance between the grinding head and a knife kept by the knife holder can be adjusted. In one embodiment the grinding unit can be placed on a cutting assembly. Thanks to the changeable distance, the distance between the grinding head and the cutting assembly can be adjusted.

Preferably the grinding head drive assembly can rotate and move a shaft. At least one grinding body is mounted on the shaft and is rotated and moved together with the shaft. A guiding assembly guides the shaft while the shaft is moved with respect to the grinding head holder. Thereby the shaft is moved along a given trajectory. This feature makes it possible to adapt the movement of the shaft and thereby of the grinding body to the shape of a cutting edge of a knife. The or every grinding body follows the trajectory while touching and sharpening the cutting edge. As the guiding assembly belongs to the grinding unit, this movement along the trajectory is achieved while the grinding head is connected with the frame and grinds a knife held in the knife holder, as well as when the grinding head is disconnected and grinds a knife outside of the knife holder.

Preferably a guiding assembly guides the shaft of the grinding head along a given trajectory. This embodiment provides an easy implementation for guiding the grinding head along the cutting edges of the knives to be ground. No drive for the grinding head needs to follow the shape of a knife to be ground. Thanks to the guiding assembly it is not necessary to adapt the grinding head drive assembly to the shape of a cutting edge to be sharpened. In one implementation the grinding head holder provides at least one shaft guiding surface. The rotated shaft stays in contact with the or at least one shaft guiding surface while being moved with respect to the grinding head holder. The shaft guiding surface determines the trajectory which the shaft follows.

Preferably the grinding device can moved over ground. An own drive for moving the grinding device over ground can be mounted but is not necessary. In one embodiment the frame with the knife holder comprises a chassis with at least one ground-engaging wheel, preferably at least three wheels. This embodiment makes it easy to move the entire grinding device to a desired place, e.g. to a source for hydraulic fluid or to an electric energy source which is required for powering the grinding head drive or to a vehicle with a cutting assembly to be ground. The frame is not only used for holding a knife to be ground but also for moving the grinding unit to a cutting assembly. The entire grinding device can easily be moved to the place of operation. If required the portable grinding unit can be disconnected from the frame. The disconnected grinding unit only needs to be carried over a short distance, e.g. from the frame to the cutting assembly belonging to a vehicle.

Preferably at least one handle, preferably two handles, is/are mounted at the grinding head holder or a further part of the grinding unit. This embodiment makes it easier to carry the grinding unit to a cutting assembly after the grinding unit is disconnected from the frame.

The grinding head drive assembly can be implemented by using hydraulic, electric, or pneumatic motors, e.g. It is possible that one kind of drive is used for rotating the grinding head and a further drive kind is used for moving the rotated grinding head.

In one embodiment several lines supply the grinding head drive assembly with fluid or electric energy. The lines are or can be connected with a source for fluid or energy. This source can be stationary or can be mounted on board of the vehicle. It is also possible that the source is mounted on board of the frame.

According to the invention the grinding unit can selectively be mounted on or otherwise be connected with the frame with the knife holder or can be disconnected from the frame and can in particular be moved onto or otherwise connected with a cutting assembly. Preferably this cutting assembly belongs to a vehicle, e.g. to an agricultural harvester (baler or loader wagon or a field chopper, e.g.). In one application the grinding unit is mounted on the cutting assembly while the vehicle is in a workshop. In a further application the grinding unit is also mounted on the cutting assembly and therefore on board of the vehicle while the vehicle is moved over ground and while the cutting assembly is used. In one application the grinding unit is mounted on board of an agricultural harvester while the harvester is moved over a field, picks up or otherwise receives crop material from the field, and conveys the picked-up crop material along the cutting assembly. The grinding unit can grind the cutting assembly while the harvester is on the field or is moved over a public street.

These and other aspects of the invention and of the preferred embodiment will be even more apparent from the detailed embodiment as described below and will be elucidated in detail there.

DETAILED DESCRIPTION OF EMBODIMENT

In the embodiment the grinding device according to the invention is used for simultaneously grinding several (in the embodiment: maximal ten) knives of an agricultural harvester, e.g. of a loader wagon or a baler. The knives to be ground belong to a cutting assembly mounted on board of the harvester. The cutting assembly which is mounted on board of the harvester and cuts picked-up or otherwise received crop material while the crop material is conveyed through a feeding channel.

The grinding device of the embodiment comprises
a grinding unit with a grinding head and
a frame comprising a knife holder and a chassis with four ground-engaging wheels.

The grinding unit can selectively be connected with the frame or can be disconnected from the frame and placed onto the cutting assembly of the harvester.

When the grinding unit is positioned on the frame with the knife holder, the grinding head can simultaneously grind several knives which are removed from the harvester—or from a further harvester—or just manufactured and are kept by the knife holder (off-board operating mode). The grinding unit can also be removed from the frame and can be placed onto the cutting assembly of the harvester and can simultaneously grind several knives of this cutting assembly (on-board operating mode). The frame is not used when the grinding device is used in the on-board operating mode and is placed on the cutting assembly.

Figure 1:
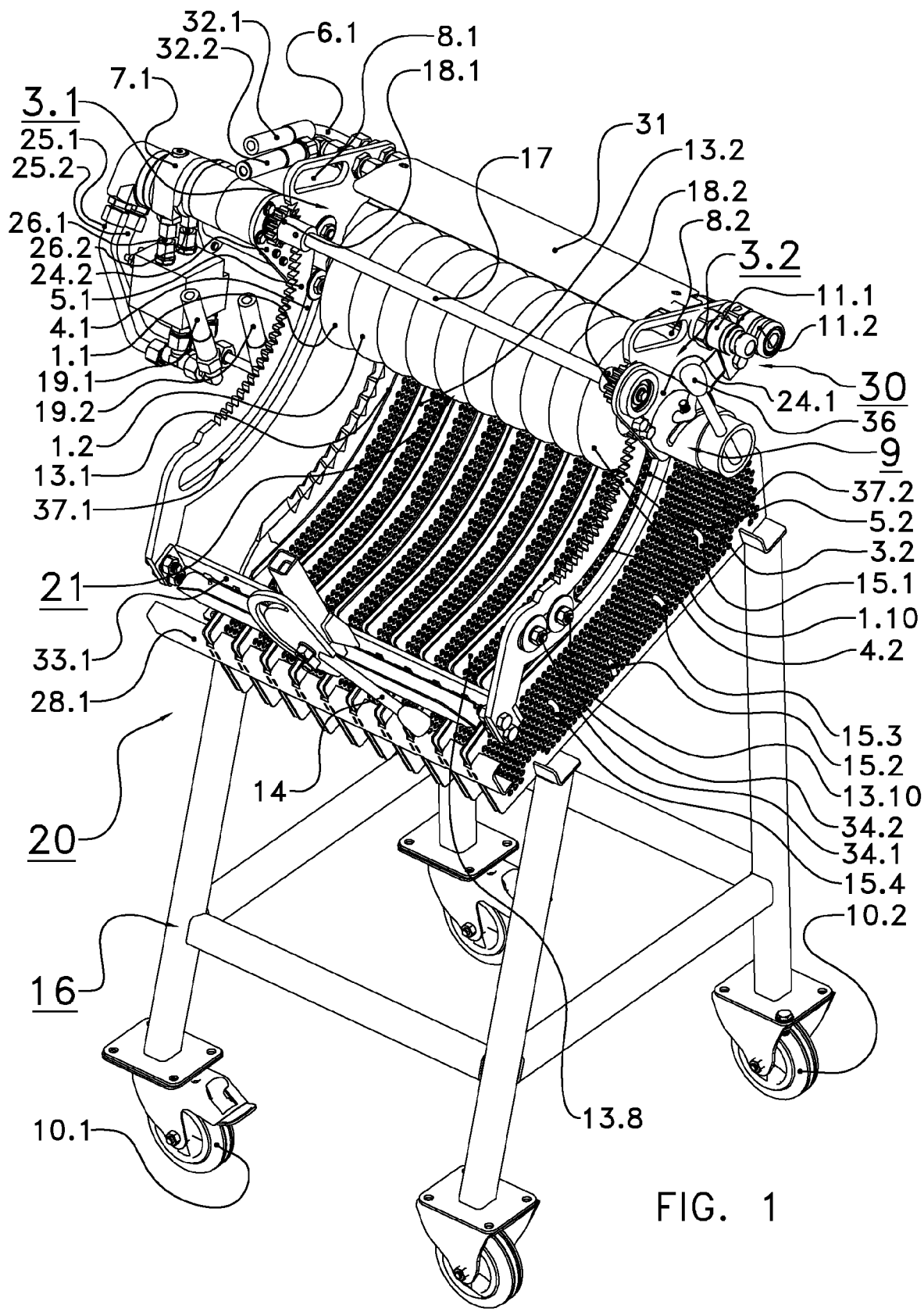
FIG. 1 shows the grinding device of the embodiment with the grinding unit placed on the frame (off-board operating mode) with the grinding discs and the horizontal adjustment device pointing to the observer.
Figure 2:
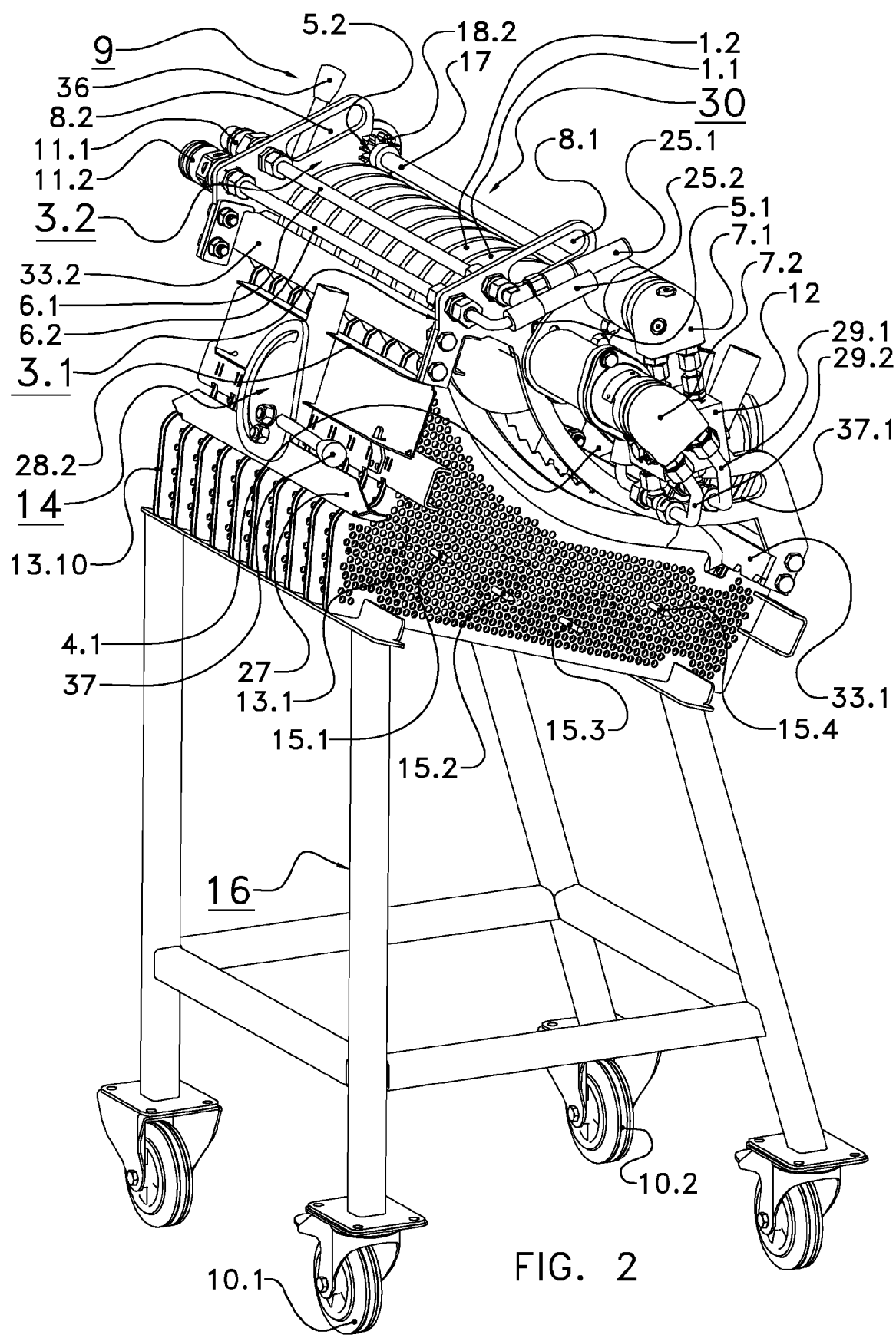
FIG. 2 shows the grinding device of FIG. 1 with the hydraulic motors pointing to the observer.
Figure 3:
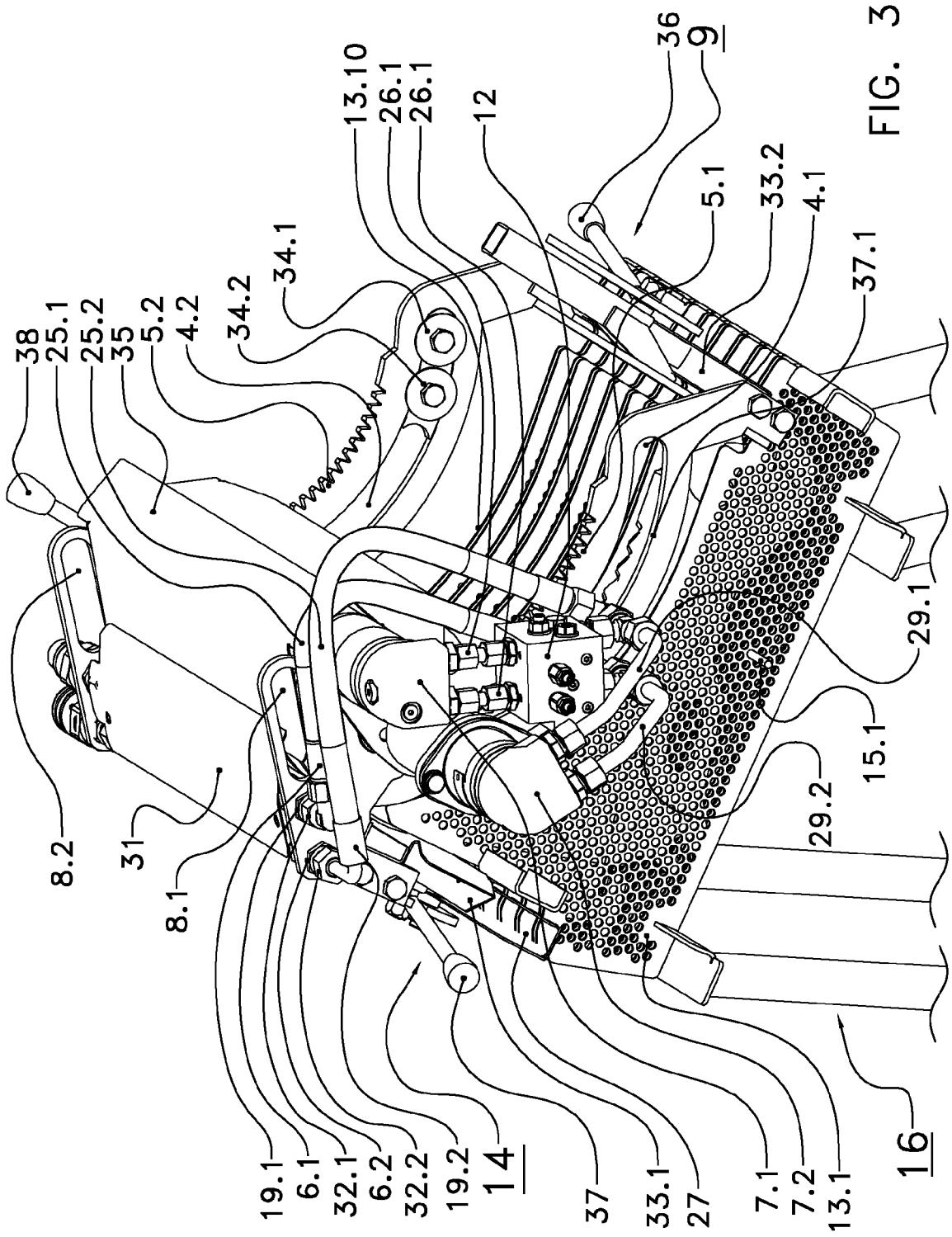
FIG. 3 shows in detail the hydraulic system for supplying the hydraulic motors of the grinding device of FIG. 1.
Figure 4:
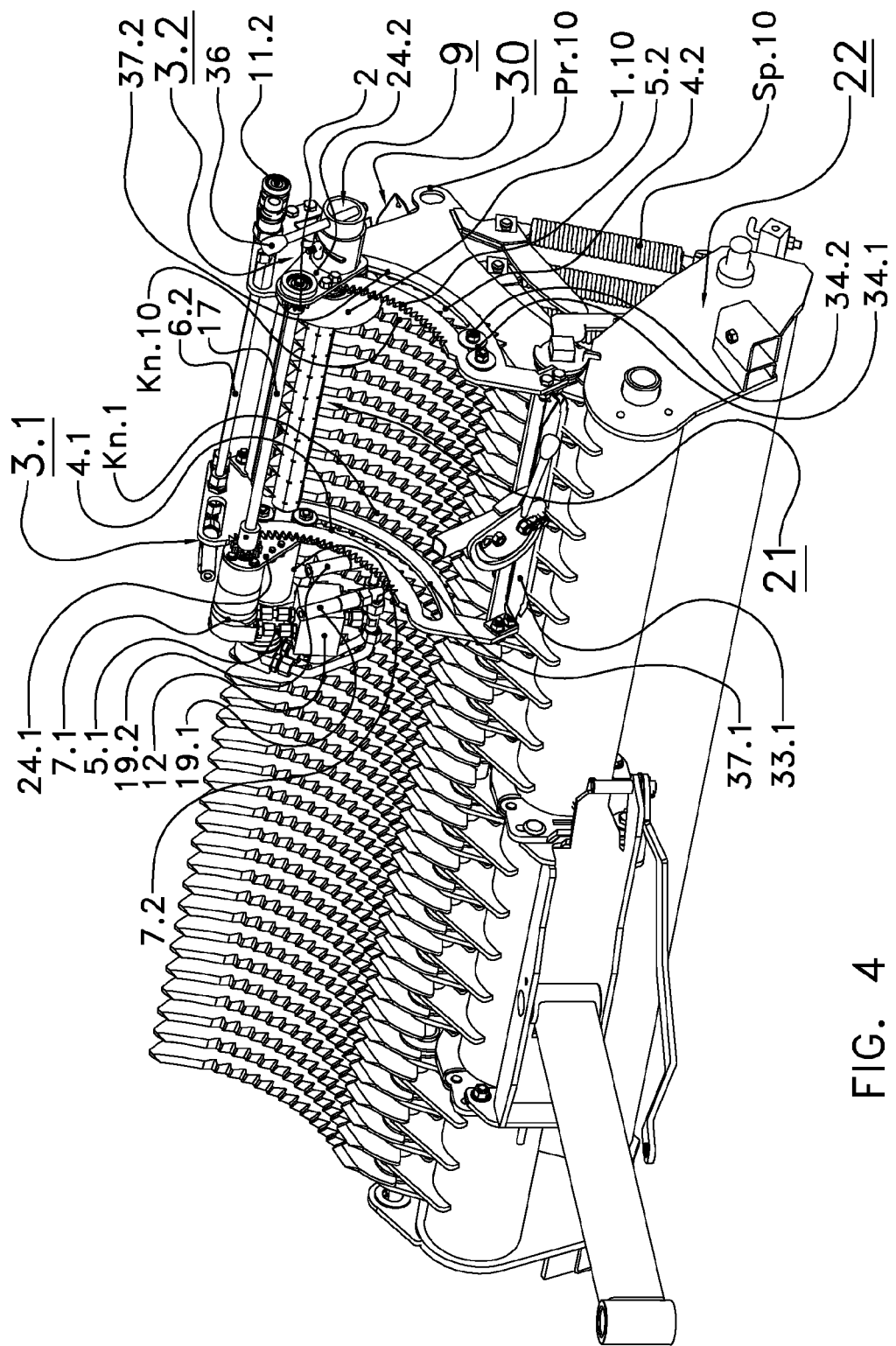
FIG. 4 shows the grinding device with the grinding unit placed onto the cutting assembly of a loader wagon (on-board operating mode) with the grinding head pointed to the observer.

FIG. 1 to FIG. 3 show the grinding device being in the off-board operating mode. FIG. 4 and FIG. 4 show the grinding unit of the grinding device being in the on-board operating mode.

Figure 5:
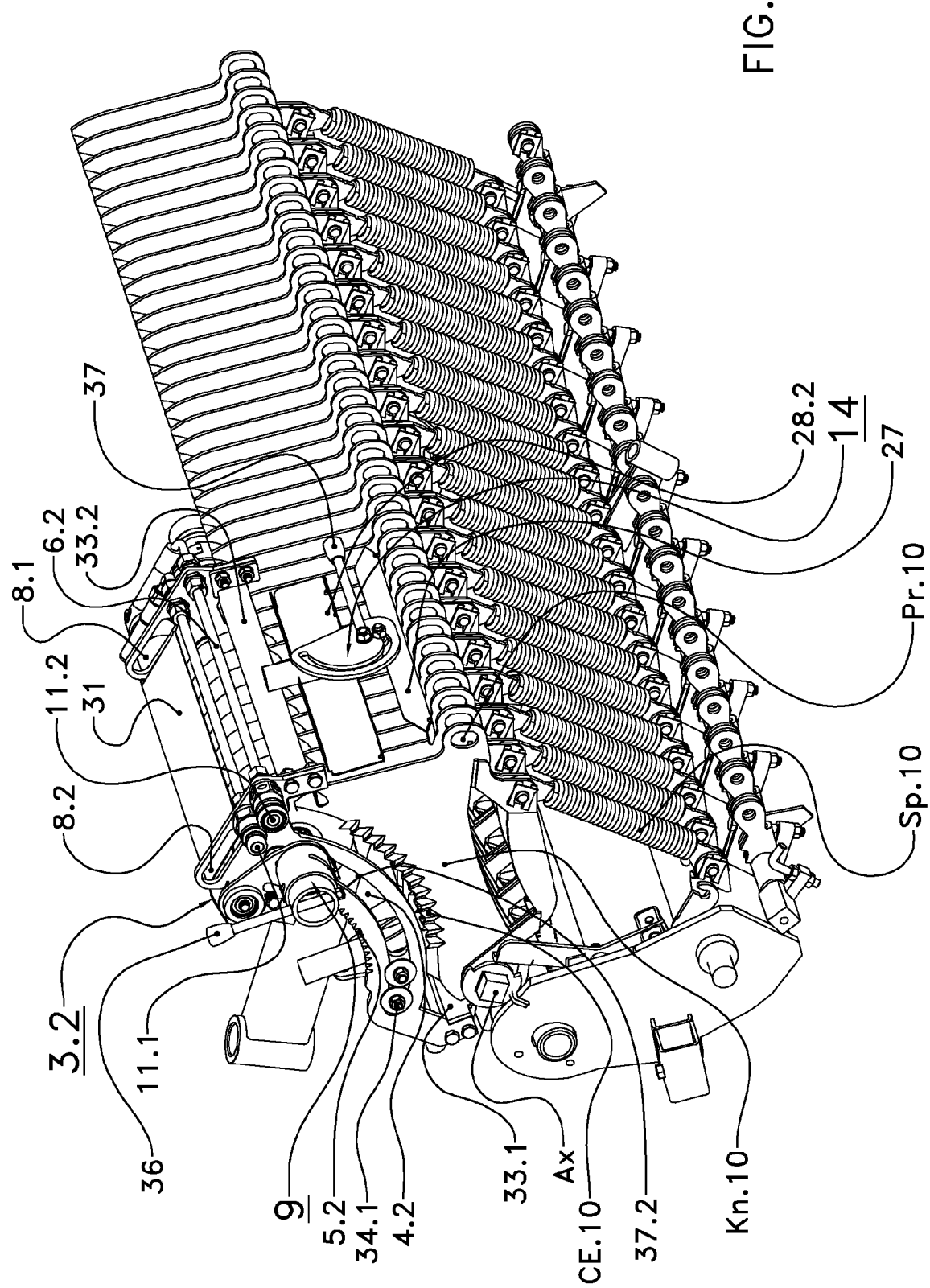
FIG. 5 shows the grinding unit of FIG. 4 with the vertical adjustment device pointing to the observer.

FIG. 1 to FIG. 5 show the grinding unit 30 of the grinding device. FIG. 1 to FIG. 3 further show the frame 20 carrying the grinding unit 30. FIG. 4 and FIG. 5 show several knives Kn.1, Kn.2, . . . to be ground and belonging to the cutting assembly of a loader wagon.

The grinding unit 30 is implemented as a portable unit and comprises
a grinding head 21,
a grinding head holder with two parallel grinding head holder members 3.1, 3.2, and
a hydraulic drive assembly with two hydraulic motors 7.1, 7.2 serving as two grinding head drives and forming the grinding head assembly of the embodiment.

The grinding head 21 comprises
a shaft 2 extending along a shaft axis and
a sequence of ten grinding discs 1.1, 1.2, . . . which are mounted on the shaft 2.

The grinding head holder members 3.1, 3.2 are rigidly connected with each other by means of two transversal beams 33.1, 33.2. A pivotal cover 35 (only shown in FIG. 3) covers the grinding head 21. The shaft 2 and thereby the grinding discs 1.1, 1.2, . . . can rotate with respect to the grinding head holder 3.1, 3.2, 33.1, 33.2 around the shaft axis. The grinding head holder members 3.1, 3.2 carry the shaft 2 and thereby the grinding discs 1.1, 1.2, . . . . The grinding discs 1.1, 1.2, . . . are positioned between the grinding head holder members 3.1 and 3.2. The shaft 2 protrudes in both directions beyond both holder members 3.1 and 3.2.

Preferably at least one spring (not shown) biases the shaft 2 in a direction parallel to the shaft axis against the knives to be ground. In one implementation every grinding disc 1.1, 1.2, . . . is rigidly mounted on the shaft 2. The shaft 2 together with the grinding discs 1.1, 1.2, . . . can be moved parallel to the shaft axis.

In an alternative implementation every grinding disc 1.1, 1.2, . . . can be moved with respect to the shaft 2 parallel to the shaft axis against a knife and can be biased independently from the other grinding discs. One assigned spring biases this grinding disc 1.1, 1.2, . . . against the knife adjacent to this grinding disc. It is possible that the grinding discs 1.1, 1.2, . . . are mounted on a joint sleeve. It is further possible that every grinding disc 1.1, 1.2, . . . is mounted on an own sleeve. The or every sleeve surrounds the shaft 2.

In the embodiment every knife Kn.1, Kn.2, . . . to be ground has an approximately triangular shape with exactly one curved cutting edge. This cutting edge CE.1, . . . , CE.10 can best be seen in FIG. 5. It is also possible to grind at least one knife comprising several curved cutting edges or a disc-shaped knife. In particular the same grinding device can also grind knives each comprising two cutting edges with coinciding shapes and dimensions. In a first step the first cutting edge is sharpened and in a subsequent second step the other cutting edge is sharpened. The knives with several cutting edges can be on board of the harvester or held by the knife holder.

A knife Kn.1, Kn.2, . . . is not moved with respect to the grinding head holder 3.1, 3.2, 33.1, 33.2 while being ground. While sharpening a cutting edge, the shaft 2 and thereby the grinding discs 1.1., 1.2, . . . are rotated. In addition the rotated grinding head 21 performs an oscillating movement with respect to the grinding head holder 3.1, 3.2, 33.1, 33.2 along a curved trajectory which is adapted to the shape of the cutting edge CE.1, . . . , CE.10 of a knife Kn.1, . . . , Kn.10 to be ground.

It is possible that the curved trajectory is defined by two upper edges of the grinding head holder members 3.1, 3.2. In the embodiment, however, this guided movement of the grinding head 21 along this curved trajectory is caused as follows: In every grinding head holder member 3.1, 3.2 a longitudinal curved slot 4.1, 4.2 is inserted. Every slot 4.1, 4.2 comprises a curved lower edge 37.1, 37.2 serving as a shaft guiding surface. The slots 4.1, 4.2 have a coinciding shape and dimension which are adapted to the coinciding shape and dimension of the cutting edges to be sharpened. The shaft 2 is positioned between the members 3.1, 3.2 and protrudes through both curved slots 4.1, 4.2. These slots 4.1, 4.2 restrict the possible movements of the shaft 2 with respect to the grinding head holder 3.1, 3.2, 33.1, 33.2 onto the required curved trajectory between two slot ends. The shaft 2 rests on both shaft guiding surfaces 37.1, 37.2. In particular the shaft 2 cannot move in a vertical direction.

In one implementation the shaft 2 can move from one slot end to the other slot end. In a preferred implementation two trajectory reducing elements 34.1, 34.2 (FIG. 3) can be inserted into the two guiding slots 4.1, 4.2 adjacent to one slot end. FIG. 1, FIG. 3, and FIG. 4 show two trajectory reducing elements 34.1, 34.2 in the slot 4.2. Corresponding trajectory reducing elements may be inserted in the other slot 4.1. These trajectory reducing elements 34.1, 34.2 reduce the provided free length of the slots 4.1, 4.2 and thereby the trajectory of a shaft 2 while the shaft 2 is rotated and shifted and is guided along the slots 4.1, 4.2. Thanks to these reducing elements 34.1, 34.2 the grinding unit 30 can simply be adapted to different lengths of the respective cutting edges of different knives: The grinding unit 30 is selectively be operated with or without trajectory reducing elements 34.1, 34.2.

A further means to adjust the grinding unit 30 to several different cutting edge shapes is as follows: At least two pairs of grinding head holder members 3.1, 3.2 are provided. The pairs distinguish from each other by slots 4.1, 4.2 with different shapes and/or dimension. For changing the trajectory which the rotated and shifted shaft 2 follows during operation, a further pair of two grinding head holder members is used and mounted into the grinding unit 30 in place of a first pair. The other parts of the grinding unit 30, in particular the grinding head 21 and the drive assembly, can be reduced.

The grinding unit 30 comprises two hydraulic motors 7.1, 7.2 which can best be seen in FIG. 2 and FIG. 3. A distance between these hydraulic motors 7.1, 7.2 occurs. In FIG. 2 and FIG. 3 the motors 7.1 and 7.2 point to the observer.

The hydraulic motor 7.2 rotates the shaft 2 around the shaft axis, e.g. the middle axis of the shaft 2, and serves as the grinding head rotating drive. Thereby the grinding discs 1.1, 1.2, . . . are rotated around this shaft axis. Every grinding disc 1.1, 1.2, . . . —or at least one disc—contacts a cutting edge of a knife Kn.1, Kn.2, . . . to be ground. The grinding disc grinds and sharpens this cutting edge. In the embodiment the motor 7.2 is mounted on an end of the shaft 2 and is moved together with the shaft 2 along the slots 4.1, 4.2.

The other hydraulic motor 7.1 serves as the grinding head shifting drive. The motor 7.1 causes the rotated and guided shaft 2 to be shifted with respect to the grinding head holder members 3.1, 3.2 in a direction perpendicular to the shaft axis. Thereby the motor 7.1 causes the shaft 2 to perform the desired oscillating movement along a trajectory as defined by the longitudinal slots 4.1, 4.2.

Different implementations how the motor 7.1 shifts the shaft 2 are possible. In one implementation the motor 7.1 is also mounted on one end of the shaft 2. An alternative implementation is described in the following and shown in the figures: The hydraulic motor 7.1 rotates a traversal bar 17 which can best be seen in FIG. 1. This traversal bar 17 is positioned parallel to the shaft 2, is mounted angularly above the grinding head 21, and serves as a wheel shaft for moving the shaft 2. Two sprocket wheels 18.1, 18.2 are rigidly mounted on this traversal bar 17. Every sprocket wheel 18.1, 18.2 engages a corresponding curved serrated edge 5.1, 5.2. Every serrated edge 5.1, 5.2 forms the upper edge of a grinding head holder member 3.1 or 3.2 and is positioned parallel to the slot 4.1, 4.2 in this member 3.1 or 3.2. Rotating the traversal bar 17 causes both sprocket wheels 18.1 and 18.2 to be rotated such that the traversal bar 17 is moved along the serrated edge 5.1, 5.2 without counting. The traversal bar 17 performs an oscillating movement along the serrated edges 5.1 and 5.2. In a preferred implementation the hydraulic motor 7.1 is mounted at one end of the traversal bar 17 adjacent to the sprocket wheel 18.1 and is moved together with the bar 17.

Two mechanical coupling elements 24.1, 24.2 connect the moved traversal bar 17 with the rotated shaft 2. In the embodiment every coupling element 24.1, 24.2 is implemented as a plate through which the traversal bar 17 and the shaft 2 are guided. The bar 17 as well as the shaft 2 can rotate with respect to the plate 24.1, 24.2 such that the shaft 2 can follow the trajectory given by the slots 4.1, 4.2 wherein a canting of the bar 17 or the shaft 2 is avoided.

Thanks to these mechanical coupling elements 24.1, 24.2 a movement of the traversal bar 17 along the serrated edges 5.1, 5.2 causes the rotated shaft 2 and the motor 7.2 to be shifted along the longitudinal slots 4.1, 4.2. The moved traversal bar 17 pulls or shifts the rotated and guided shaft 2 via the coupling elements 24.1, 24.2. It suffices that the motor 7.1 rotates the traversal bar 17. The trajectory for the shaft 2 is achieved by the slots 4.1, 4.2 which guide the moved shaft 2. The motor 7.1 needs not to be adapted to the trajectory.

FIG. 1, FIG. 2, and FIG. 3 further shows how the hydraulic motors 7.1, 7.2 are supplied with hydraulic fluid by using a hydraulic distributor 12. Every hydraulic motor 7.1, 7.2 is connected with this hydraulic distributor 12 by means of two parallel rigid fluid lines, one for every flow direction. The fluid lines 26.1, 26.2 connect the distributor 12 with the hydraulic motor 7.1. The fluid lines 29.1, 29.2 connect the distributor 12 with the hydraulic motor 7.2.

A source for pressurized hydraulic fluid can be mounted at the frame. In the embodiment, however, the source is positioned outside of the grinding unit, e.g. on board of a tractor or harvester or as a stationary device in a workshop. The hydraulic distributor 12 is supplied with hydraulic fluid as follows: The hydraulic distributor 12 is further connected with two elastic hoses 25.1, 25.2. The elastic hoses 25.1, 25.2 supply the distributor 12 and thereby the motors 7.1, 7.2 with fluid while the grinding head 21 oscillates along the slots 4.1, 4.2. These hoses 25.1, 25.2 are connected with two rigid fluid lines 6.1, 6.2. One fluid line 6.1 is used for guiding fluid from the source via the respective hose 25.1 to the distributor 12. The other fluid line 6.2 is used for guiding fluid away from the distributor 12 via the respective hose 25.2 back to the source. The rigid fluid lines 6.1, 6.2 are partially covered by a pivotal cover 31.

The connection between the hoses 25.1, 25.2 and the lines 6.1, 6.2 can be disconnected. FIG. 1 shows the disconnected state. FIG. 2 and FIG. 3 show the connected state. The hoses 25.1, 25.2 each have a rigid end piece 19.1, 19.2. The fluid lines 6.1, 6.2 each have a rigid end piece 32.1, 32.2. Every end piece 19.1, 19.2 can be connected with an end piece 32.1, 32.2.

The fluid line 6.1 ends in a rigid connector 11.1. The fluid line 6.2 ends in a rigid connector 11.2. For supplying the grinding unit 30 with fluid, further hoses (not part of the grinding device) can be connected with the hydraulic source and with these connectors 11.1, 11.2 as can best be seen in FIG. 4. The hydraulic source for the hydraulic motors 7.1, 7.2 can be positioned on board of a tractor pulling an agricultural harvester or on board of the agricultural harvester itself or on board of a stationary device which is operated in a workshop.

During operation both hydraulic motors 7.1, 7.2 are supplied with pressurized hydraulic fluid via the distributor 12. Preferably the hydraulic motor 7.2 continuously rotates the shaft 2 and thereby the grinding discs 1.1, 1.2 in one rotating direction, e.g. always with the same rotational speed. The hydraulic motor 7.1 is laterally mounted on the traversal bar 17, rotates the traversal bar 17 subsequently in both rotating directions and thereby causes the rotated shaft 2 to oscillate along the longitudinal slots 4.1, 4.2.

An entire grinding assembly performs the oscillating movement with respect to the grinding head holder 3.1, 3.2, 33.1, 33.2 along the guiding slots 4.1, 4.2 without a relative movement of one assembly part to a further assembly part. This grinding assembly comprises the following parts:

the shaft 2,
the grinding discs 1.1, 1.2, ... mounted on the shaft 2,
the hydraulic motors 7.1, 7.2,
the transversal bar 17,
the sprocket wheels 18.1, 18.2 on the bar 17,
the mechanical coupling elements 24.1, 24.2,
the hydraulic distributor 12, and
the rigid fluid lines 26.1, 26.2, 29.1, 29.2.

For causing an oscillating movement the hydraulic motor 7.1 rotates the traversal bar 17 with the sprocket wheels 18.1, 18.2 in one direction until the shaft 2 reaches one end of every slot 4.1 and 4.2. This event is automatically detected and causes the hydraulic motor 7.1 to rotate the bar 17 in the inverted direction.

Several implementations how to automatically detect the event that the shaft 2 has reached the slot end and to invert the rotating direction are possible:

In one embodiment a contact switch is mounted near the end of a slot 4.1 and/or 4.2. The shaft 2 touches this contact switch. This event causes the hydraulic distributor 12 to invert the rotating direction of the transversal bar 17.

In a further embodiment a pressure sequence valve or oscillating valve is mounted in the interior of the hydraulic distributor 12. This valve directs the hydraulic fluid into one rigid fluid line 26.1, 26.2 guiding from the distributor 12 to the hydraulic motor 7.1 until the shaft 2 reaches the slot end or a reducing element 34.1, 34.2. The other line 26.2, 26.1 guides fluid away from the hydraulic motor 7.1 to the hydraulic distributor 12 and from there back to the fluid source. As soon as the shaft 2 reaches the slot end, the hydraulic pressure significantly increases. This event causes the valve to direct the fluid into the other line, i.e. the two hydraulic lines 26.1 and 26.2 change their roles. The effect: The bar 17 is rotated in the opposite direction.

In place of hydraulic motors two electric motors can be used. The contact switch can trigger a rotation change of the electric motor for the traversal bar 17. An increase of electric power consumption can be measured and used for triggering the inversion of the rotating direction.

During operation the grinding unit 30 rests on a foot 27 formed by two parallel L-shaped lower transversal beams which can best be seen in FIG. 3 and FIG. 5. This foot 27 is mechanically connected with two upper transversal beams 28.1, 28.2. Every upper transversal beam 28.1, 28.2 is rigidly connected with both grinding head holder members 3.1, 3.2. Preferably the foot 27 is implemented as a slide such that the position of the entire grinding unit 30 with respect to a cutting assembly 22 or to the frame 20 can be adjusted in a horizontal direction by shifting the grinding unit 30 with the slide 27 in a horizontal direction.

The vertical height of the grinding unit 30 and thereby the distance between the grinding head 21 and the knives Kn.1, Kn.2, ... to be ground can be adjusted by changing the distance between the foot 27 and the upper transversal beams 28.1, 28.2. This adjustment can be performed for knives held by the knife holder as well as for knives mounted on board of a harvester. For changing this distance a vertical adjusting device 14 with a handle can manually be operated, cf. FIG. 2 and FIG. 5. It is also possible that a positioning motor helps to adjust the vertical distance between the shaft 2 and a knife.

In addition the shaft 2 and thereby the grinding discs 1.1, 1.2, ... can horizontally be moved with respect to the grinding head holder 3.1, 3.2, 33.1, 33.2 such that the horizontal distance between the grinding discs 1.1, 1.2, ...

and a knife Kn.1, Kn.2, . . . to be ground can be changed. For changing this horizontal distance the grinding unit 30 comprises a horizontal adjustment device 9, cf. FIG. 1 and FIG. 4. This horizontal adjustment device 9 comprises
- a handle 36 which is rigidly mounted on an inner sleeve,
- an outer sleeve with a helical aperture, and
- a pin connected with the inner sleeve and engaging the helical aperture of the outer sleeve.

The inner sleeve with the handle 36 is connected with the shaft 2. The outer sleeve with the helical aperture is rigidly connected with the grinding head holder member 3.2. Rotating the handle 36 causes the pin to move along the helical aperture in the outer sleeve. This movement causes the shaft 2 to perform a linear movement along the shaft axis with respect to the knives Kn.1, Kn.2, . . . to be ground. The grinding discs 1.1, 1.2, . . . are mounted on the shaft 2 and are therefore also moved with respect to the knives Kn.1, Kn.2, . . . to be ground. It is also possible that a positioning motor helps to move the shaft 2 parallel to the shaft axis.

As already mentioned FIG. 1 to FIG. 3 show the grinding device of the embodiment in the off-board operating mode. In this mode those knives can be ground which are held by the knife holder, e.g. as the knives to be ground cannot be reached by the grinding unit 30 while the knives are mounted on board of the harvester or before a knife is mounted on board of the harvester. In FIG. 1 to FIG. 3 the knives to be ground and kept by the knife holder are omitted.

In the off-board operating mode the grinding unit 30 is placed on the frame 20 and thereby above the knife holder. Preferably the grinding unit 30 is temporarily locked at the frame 20. The locking connection can be released again. This frame 20 comprises the knife holder which can simultaneously hold and fix in a vertical position a sequence of several (in the embodiment maximal ten) knives Kn.1, Kn.2, . . . to be ground. The knife holder comprises a sequence of ten knife holder plate pairs 13.1, 13.2, . . . . Every pair comprises two parallel vertical plates. A knife can vertically be positioned between the opposing plates of a pair 13.1, 13.2, . . . . Two opposing plates of a pair prevent a lateral movement of the knife, i.e. a movement of the knife in a direction parallel to the shaft 2 of the grinding head 21 and thereby away from a grinding disc 1.1, 1.2, . . . .

In the embodiment a movement of a knife Kn.1, Kn.2, . . . kept by the knife holder in a direction perpendicular to the shaft 2, e.g. downwards or angularly or horizontally, is prevented as follows: A hole pattern is inserted into every knife holder plate, cf. FIG. 1 and FIG. 2. Every hole pattern comprises a plurality of holes. Several pins 15.1, 15.2, . . . can be shifted through corresponding holes of the plates of the ten knife holder pairs 13.1, 13.2, . . . . These pins 15.1, 15.2 carry the ten knives from below. The knives Kn.1, Kn.2, . . . to be ground are carried and kept by these pins 15.1, 15.2, . . . and by the force of gravity. A knife holder pair 13.1, 13.2, . . . , the pins 15.1, 15.2, . . . , and a grinding disc 1.1, 1.2, . . . above the knife keep the knife in a fixed position with respect to the grinding head holder 3.1, 3.2, 33.1, 33.2 such that the rotated and moved grinding disc 1.1, 1.2, . . . touches and sharpens the cutting edge of this knife Kn.1, Kn.2, . . . and the knife cannot move away in any direction. Thanks to the hole patterns and the pins 15.1, 15.2, . . . the knife holder can subsequently carry knives with different shapes. It is also possible that the grinding device is first moved to a first harvester and the grinding unit 30 is placed on the cutting assembly of the first harvester and grinds knives of the first harvester. Later the grinding device is moved to a second harvester and the same grinding unit 30 grinds knives of the second harvester.

The knife holder with the holder plates 13.1, 13.2, . . . is rigidly mounted on a chassis 16. This chassis 16 comprises
- four vertical beams,
- four horizontal enforcing beams, and
- four ground-engaging wheels 10.1, 10.2, . . . mounted at the lower ends of the vertical beams.

Every ground-engaging wheel 10.1, 10.2, . . . is provided with a fixing brake. When being activated, this fixing brake can inhibit a rotation of the assigned wheel. Thanks to the ground-engaging wheels 10.1, 10.2, . . . the frame 20 and thereby the entire grinding device can be moved over ground, e.g. can first be moved to an agricultural harvester for taking the knife, can subsequently be moved to a source for hydraulic fluid, and can temporarily be locked at a selected position on ground by activating the fixing brakes.

In the off-board operating mode the grinding device operates as follows:
- The operator places the maximal ten knives to be ground in the knife holder. While the knives Kn.1, Kn.2, . . . are inserted between the plate pairs 13.1, 13.2, . . . and are fixed, the grinding unit 30 is preferably removed from the frame 20. Every knife Kn.1, Kn.2, . . . is laterally kept by a knife holder pair 13.1, 13.2, . . . of plates and is supported from below by several pins 15.1, 15.2, . . . . Preferably the operator places the knives Kn.1, Kn.2, . . . between the pairs 13.1, 13.2, . . . and above the pins 15.1, 15.2, . . . such that all cutting edges are substantially parallel to the slots 4.1, 4.2, . . . .
- The operator places the grinding unit 30 on the frame 20 carrying the knives.
- The operator adjusts the grinding unit 30 with respect to the knives kept by the frame 20 by using the adjustment devices 9, 14.
- The operator locks the grinding unit 30.
- The operator connects the connectors 11.1, 11.2 by means of hoses with a source for pressurized fluid.
- The operator switches on the hydraulic motors 7.1, 7.2.
- The shaft 2 is rotated and automatically performs several oscillating movements along the slots 4.1, 4.2.
- In one implementation a counter counts the number of oscillating movements of the shaft 2 along the slots 4.1, 4.2. In a further implementation the operator counts the movement number.
- After the shaft 2 has performed the required number of movements along the slots 4.1, 4.2, the hydraulic motors 7.1, 7.2 are switched off—either triggered automatically by the counter or manually by the operator. Preferably the shaft 2 remains in a position adjacent to the upper end of the slots 4.1, 4.2.
- The operator takes the ground knives Kn.1, Kn.2, . . . out of the knife holder.

The grinding unit 30 can be disconnected from the frame 20. An operator can carry the disconnected grinding unit 30 to a cutting assembly 22 by means of two apertures 8.1, 8.2 serving as handles. These handles 8.1, 8.2 are connected with the grinding head holder members 3.1, 3.2.

FIG. 4 and FIG. 5 show the grinding device in the on-board operating mode. The grinding unit 30 has been disconnected from the frame 20 and is placed on the cutting assembly 22 of an agricultural loader wagon. For sake of clarity FIG. 4 only shows one grinding disc 1.10.

This cutting assembly 22 comprises a sequence of knives Kn.1, Kn.2, . . . . While the loader wagon is moved over an agricultural field, the knives Kn.1, Kn.2, . . . are in a cutting position and engage from below into a feeding channel. A conveying rotor (not shown) conveys picked-up or otherwise received crop material through this feeding channel and presses the conveyed crop material through the gaps between two adjacent knives of the cutting assembly 22.

In the situation shown in FIG. 4 and FIG. 5 the loader wagon is in a workshop. For performing the grinding operation and further maintenance operations and for taking out a knife out of the cutting assembly 22, the cutting assembly 22 is first lowered down such that the knives do not longer engage into the feeding channel and do no longer cooperate with the conveying rotor. Afterwards the cutting assembly 22 is shifted laterally, i.e. perpendicular to the travelling direction of the loader wagon and to the conveying direction of crop material, into a maintenance position—like the drawer of a cupboard. FIG. 4 and FIG. 5 show the cutting assembly 22 in such a lateral maintenance position. FIG. 5 further shows the horizontal rotating axis Ax around which the knives Kn.1, Kn.2, . . . can be rotated between the cutting position and the lowered position. Several springs Sp.1, Sp.2, . . . tend to keep the knives Kn.1, Kn.2, . . . in the cutting position. In FIG. 4 and FIG. 5 the knives are kept in a maintenance position against the force of these springs. It is also possible that a hydraulic actuator can moves the knives via a shaft and several levers.

As can best be seen in FIG. 5, the foot 27 rests on protrusions Pr.1, Pr.2, . . . of the knives Kn.1, Kn.2, . . . when the grinding device is used in the on-board operating mode. The grinding head 21 can horizontally be adjusted with respect to the knives Kn.1, Kn.2, . . . by the adjustment device 9 and can vertically be adjusted by the adjustment device 14. When grinding the knives Kn.1, Kn.2, . . . , the shaft 2 is rotated. In addition the rotated shaft 2 is moved with respect to the grinding head holder 3.1, 3.2, 33.1, 33.2 along the slots 4.1 and 4.2 in that way which has been described above for the off-board operating mode.

In the embodiment the cutting assembly 22 comprises more than ten knives. Therefore the grinding unit 30 is subsequently placed in different positions on the cutting assembly 22. In every position the grinding unit 30 simultaneously grinds ten adjacent knives of the cutting assembly 22 being in the maintenance position.

In the on-board operating mode the grinding device operates as follows:

The operator moves the grinding device with the grinding unit 30 resting on the frame 20 in the vicinity of a harvester wherein the cutting assembly 22 of this harvester is in the lateral maintenance position.

The operator disconnects the grinding unit 30 from the frame 20, grasps the handles 8.1, 8.2, carries the disconnected grinding unit 30 to the harvester, and places the grinding unit 30 on the cutting assembly 22.

The operator adjusts the grinding unit 30 with respect to the knives Kn.1, Kn.2, . . . of the cutting assembly 22.

The operator connects the connectors 11.1, 11.2 with a hydraulic source, preferably being on board of a tractor pulling the harvester.

The operator switches on the motors 7.1, 7.2.

After the shaft 2 has performed the required number of movements, the hydraulic motors 7.1, 7.2 are switched off again.

The operator places the grinding unit 30 onto a further sequence of ten knives to be ground and let the grinding head 21 being moved and grinding the ten knives.

When all knives of the loader wagon are ground, the operator places the grinding unit 30 again on the frame 20, locks the grinding unit 30, and moves away the entire grinding device.

The cutting assembly 22 is moved back into the cutting position.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

| | |
|---|---|
| 1.1, 1.2, . . . , 1.10 | grinding discs of the grinding head 21, rigidly mounted on the shaft 2 |
| 2 | shaft on which the grinding discs 1.1, 1.2, . . . , 1.10 are mounted, protrudes through the slots 4.1, 4.2, is rotated by the motor 7.2 and is shifted by the motor 7.1 |
| 3.1, 3.2 | grinding head holder members, hold and guide the rotated and shifted shaft 2, comprise the slots 4.1 and 4.2, rigidly connected by the traversal beams 33.1, 33.2 |
| 4.1, 4.2 | curved longitudinal slots cut in the grinding head holder members 3.1, 3.2, provide the shaft guiding surfaces |
| 5.1, 5.2 | curved serrated upper edges of the grinding head holder members 3.1, 3.2 into which the sprocket wheels 18.1, 18.2 engage |
| 6.1 | rigid fluid line, connects the connector 11.1 with the hose 25.1 |
| 6.2 | rigid fluid line, connects the connector 11.2 with the hose 25.2 |
| 7.1 | hydraulic motor for rotating the traversal bar 17, thereby moving the shaft 2 along the trajectory defined by the slots 4.1, 4.2, mounted on the traversal bar 17 |
| 7.2 | hydraulic motor for rotating the shaft 2, mounted on one end of the shaft 2 |
| 8.1, 8.2 | handles for carrying the portable grinding unit 30 |
| 9 | adjusting device for horizontally adjusting the shaft 2 with respect to the knives Kn.1, Kn.2, . . . in a direction parallel to the shaft axis, comprises the handle 36 |
| 10.1, 10.2, . . . | ground engaging wheels of the chassis 16 |
| 11.1 | connector for the fluid line 6.1 |
| 11.2 | connector for the fluid line 6.2 |
| 12 | hydraulic distributor, connects the hoses 25.1, 25.2 with the hydraulic motors 7.1, 7.2 |
| 13.1, 13.2, . . . | knife holder plate pairs with hole patterns for the pins 15.1, 15.2, . . . |

| | |
|---|---|
| 14 | adjustment device for adjusting the shaft 2 in a direction perpendicular to the shaft axis, enables adjusting the vertical distance between the foot 27 and the beams 28.1, 28.2. |
| 15.1, 15.2 | pins which can be guided through the holes in the knife holder plates 13.1, 13.2, . . . |
| 16 | chassis with the ground-engaging wheels 10.1, 10.2, . . . , belong to the frame 20 |
| 17 | traversal bar, carries the sprocket wheels 18.1, 18.2 and the motor 7.1, serves as the wheel shaft |
| 18.1, 18.2 | sprocket wheels mounted on the traversal bar 17, engage the serrated edges 5.1, 5.2 |
| 19.1 | rigid end piece of the hose 25.1, can be connected with the end piece 32.1 of the line 6.1 |
| 19.2 | rigid end piece of the hose 25.2, can be connected with end piece 32.2 of the line 6.2 |
| 20 | frame comprising the knife holder plates 13.1, 13.2 and the chassis 16 |
| 21 | grinding head comprising the shaft 2 and the grinding discs 1.1, 1.2, . . . |
| 22 | cutting assembly with the knives Kn.1, Kn.2 to be ground, . . . , mounted on board of a harvester |
| 24.1, 24.2 | mechanical coupling elements, couple the rotated traversal bar 17 with the shaft 2 |
| 25.1 | hose, connects the fluid line 6.1 with the hydraulic distributor 12, can be connected with the line 6.1 by the end pieces 19.1 and 32.1 |
| 25.2 | hose, connects the fluid line 6.2 with the hydraulic distributor 12, can be connected with the line 6.2 by the end pieces 19.2 and 32.2 |
| 26.1, 26.2 | rigid fluid lines, connect the hydraulic distributor 12 with the hydraulic motor 7.1 on the bar 17 |
| 27 | L-shaped lower transversal beam of the vertical adjustment device 14, serves as the foot of the grinding unit 30 |
| 28.1, 28.2 | upper transversal beams of the vertical adjustment device 14, rigidly connected with the knife holder plate pairs 13.1, 13.2, . . . |
| 29.1, 29.2 | rigid fluid lines, connect the hydraulic distributor 12 with the hydraulic motor 7.2 on the shaft 2 |
| 30 | grinding unit, comprises the grinding head 21, the grinding head holder members 3.1, 3.2, the drives 7.1, 7.2, and the transmission member 17, 24.1, 24.2 |
| 31 | pivotal cover for the rigid fluid lines 6.1, 6.2 |
| 32.1 | rigid end piece of the rigid fluid line 6.1, can be connected with the end piece 19.1 of the hose 25.1 |
| 32.2 | rigid end piece of the rigid fluid line 6.2, can be connected with the end piece 19.2 of the hose 25.2 |
| 33.1, 33.2 | transversal beams of the grinding head holder, rigidly connect the grinding head holder members 3.1, 3.2 with each other |
| 34.1, 34.2 | trajectory reducing element, can be inserted into a slot 4.1, 4.2 |
| 35 | pivotal cover for the grinding discs 1.1, 1.2, . . . of the grinding head 21 |
| 36 | handle of the adjustment device 9 |
| 37.1, 37.2 | guiding surfaces provided by the slots 4.1, 4.2 |
| Ax | rotating axis around which the knives Kn.1, . . . can be pivoted between a cutting position and a lowered non-cutting position |
| CE.1, . . . , CE.10 | cutting edges of the knives Kn.1, . . . , are sharpened by the grinding discs 1.1, 1.2, . . . |
| Kn.1, Kn.2, . . . , Kn.10 | knives to be ground, comprise the cutting edges CE.1, . . . , CE.10, belong to the cutting assembly 22, can be inserted into the knife holder |
| Pr.1, . . . , Pr.10 | rear protrusions of the knives Kn.1, . . . Kn.10, can carry the food 27 |
| Sp.1, . . . , Sp.10 | springs for keeping the knives Kn.1, . . . Kn.10 in the cutting position |

The invention claimed is:

1. A grinding device comprising:

a stand-alone frame comprising a knife holder arranged to hold at least two knives to be ground, one after the other; and a portable grinding unit, comprising:

a grinding head;

a grinding head holder holding the grinding head; and a grinding head drive assembly configured to rotate the grinding head with respect to the grinding head holder, and move the grinding head along a curved trajectory in contact with the one knife, and subsequently the other knife of at least two knives to be ground, thereby grinding a cutting edge of the one knife and subsequently the other knifes held by the knife holder, and wherein the stand-alone frame further comprises a releasable connection to the portable grinding unit, wherein the grinding head drive assembly is further configured to move and to rotate the grinding head when the portable grinding unit is connected with the frame, and when the portable grinding unit is disconnected from the frame and mounted to a cutting assembly of an agricultural harvester to grind at least two knives of the cutting assembly, one after the other.

2. The grinding device according to claim 1, wherein the knife holder is configured to hold the one knife and subsequently the other knife to be ground in a position in which the cutting edge of the knife to be ground extends in a vertical plane.

3. The grinding device according to claim 1, wherein the grinding head comprises a shaft extending along a shaft axis and the knife holder comprises at least one pair of parallel plates extending perpendicular to the shaft axis, and the at least one pair of parallel plates is arranged to inhibit movement of the one knife and subsequently the other knife to be ground in a direction parallel to the shaft axis.

4. The grinding device according to claim 1, wherein the frame is arranged to be moved over ground.

5. The grinding device according to claim 4, wherein the knife holder is mounted on a chassis comprising at least one ground-engaging wheel.

6. The grinding device according to claim 1, wherein the portable grinding unit is positioned vertically above the frame when connected with the frame.

7. The grinding device according to claim 1, wherein the grinding head comprises:
   a shaft; and
   a sequence of grinding bodies mounted on the shaft;
   wherein the grinding head drive assembly is arranged to rotate and to move the shaft and thereby the grinding bodies with respect to the grinding head holder, and
   wherein the grinding bodies are arranged for one of the grinding bodies to contact the one knife, and subsequently the other knife of the at least two knives to be ground.

8. The grinding device according to claim 1,
   wherein the grinding head holder rests on a foot of the portable grinding unit, and
   wherein the distance between the grinding head holder and the foot is changeable.

9. A grinding device comprising:
   a stand-alone frame comprising a knife holder arranged to hold at least two knives to be ground, one after the other; and
   a portable grinding unit comprising:
      a grinding head;
      a grinding head holder holding the grinding head; and
      a grinding head drive assembly configured to rotate the grinding head with respect to the grinding head holder, and move the grinding head along a curved trajectory in contact with the one knife, and subsequently the other knife of the at least two knives to be ground, thereby grinding a cutting edge of the one knife and subsequently the other knife held by the knife holder; wherein the stand-alone frame further comprises a releasable connection to the portable grinding unit,
   wherein the grinding head drive assembly is further configured to move and to rotate the grinding head when the portable grinding unit is connected with the frame, and when the portable grinding unit is disconnected from the frame and mounted to a cutting assembly of an agricultural harvester to grind at least two knives of the cutting assembly, one after the other;
   wherein the knife holder comprises:
      at least two parallel plates; and
      a plurality of pins,
         wherein each plate of the at least two parallel plates has a hole pattern with a plurality of holes,
         wherein each pin of the plurality of pins is arranged to be shifted through a pair of opposing holes in each plate of the at least two parallel plates, and
         wherein adjacent plates are arranged to carry a knife by means of at least two pins shifted through the opposing holes.

10. A grinding device comprising:
   a stand-alone frame comprising a knife holder arranged to hold at least two knives to be ground, one after the other; and
   a portable grinding unit comprising:
      a grinding head;
      a grinding head holder holding the grinding head; and
      a grinding head drive assembly configured to rotate the grinding head with respect to the grinding head holder, and move the grinding head along a curved trajectory in contact with the one knife, and subsequently the other knife of the at least two knives to be ground, thereby grinding a cutting edge of the one knife and subsequently the other knife held by the knife holder; wherein the stand-alone frame further comprises a releasable connection to the portable grinding unit,
   wherein the grinding head drive assembly is further configured to move and to rotate the grinding head when the portable grinding unit is connected with the frame, and when the portable grinding unit is disconnected from the frame and mounted to a cutting assembly of an agricultural harvester to grind at least two knives of the cutting assembly, one after the other;
   wherein the grinding head comprises;
      a shaft; and
      at least one grinding body mounted on the shaft; and
      the portable grinding unit comprises a guiding assembly,
   wherein the grinding head drive assembly is arranged to rotate and to shift the shaft and thereby the grinding body mounted on the shaft, and
   wherein the guiding assembly is arranged to guide the rotated and shifted shaft of the grinding head with respect to the grinding head holder along a given trajectory.

11. The grinding device according to claim 10,
   wherein the guiding assembly provides at least one shaft guiding surface,
   wherein the rotated and shifted shaft stays in contact with the at least one shaft guiding surface, and
   wherein the at least one shaft guiding surface guides the shaft with respect to the grinding head holder along the given trajectory.

* * * * *